Feb. 22, 1966     L. E. CURTISS     3,236,710
METHOD AND APPARATUS FOR MAKING FIBROUS LIGHT-CONDUCTING DEVICES
Filed Dec. 19, 1960     5 Sheets-Sheet 5

United States Patent Office 3,236,710
Patented Feb. 22, 1966

3,236,710
METHOD AND APPARATUS FOR MAKING
FIBROUS LIGHT-CONDUCTING DEVICES
Lawrence E. Curtiss, New York, N.Y., assignor of thirty-three and one-third to Basil I. Hirschowitz, Birmingham, Ala., and thirty-three and one-third to Wilbur Peters, Ann Arbor, Mich.
Filed Dec. 19, 1960, Ser. No. 76,868
19 Claims. (Cl. 156—167)

This invention relates to a method and apparatus for manufacturing light transmitting devices of the type which comprises a large number of elongated transparent filaments or fibers of extremely small diameter arranged in a bundle so as to transmit light or an image from one end to the other end of the fiber bundle. More particularly, the present invention relates to an improved method and apparatus for making such fiber optic devices at high speed and with enhanced precision.

The transmission of light or optical images by means of a bundle of a multiplicity of very thin transparent fibers as distinguished from conventional lenses or mirrors has long been known. However, considerable difficulty has been encountered in making devices of this class. This may be better appreciated when it is understood that the elongated transparent fibers may each be as small or smaller than .001 inch in diameter. Furthermore, as is brought out in the copending application of Lawrence E. Curtiss filed on May 6, 1957, Serial No. 657,325; each fiber, to ensure efficient light transmission, includes a core formed of a glass having one index of refraction and a uniform coating over the entire surface of the core having an index of refraction which is lower than that of the core. Each of the fibers should be substantially uniform from end to end and, while exceedingly flexible, must be handled carefully both during the formation and after the formation of the bundle to avoid breakage. For some purposes substantially rigid bundles may be formed while for others a high degree of flexibility intermediate the ends of the bundle may be provided.

The fiber optic bundles may vary widely both in length and in diameter or width depending upon their ultimate use, for example, the length of the bundles may vary from a few inches to a yard or more and there may be as many as 100,000 or more individual coated fibers in a bundle having a cross sectional area of about one-half inch square.

The fiber bundles may be used to conduct light or an image or they may be utilized as both light and image conductors. In either case, it is necessary to minimize the occurrence of defects which tend to reduce the light conductance of the fiber or the bundle made therefrom from one end to the other, particularly as the length of the device is increased. In addition, in the case of an image conductor, it is necessary to provide a highly accurate alignment of the opposite ends of the fibers. For example, the objective ends of the fibers receive light from the field depending upon their mutual orientation and if the same mutual orientation is faithfully maintained at the eye piece end of the device the image is conducted without loss in resolution which would result from misalignment of the fibers at one end relative to their opposite ends.

One problem encountered in the manufacture of such devices involves the difficulty which has been experienced in maintaining the width or diameter of the fiber constant during the drawing process. For example, in the method brought out in said copending application, a glass rod having the desired index of refraction for forming the core of the fiber is mounted within a tube of a glass having an index of refraction desired in the coating so that both may be simultaneously heated to a temperature at which a fiber having a core and a coating of the desired composition and thickness may be drawn therefrom. The material forming the core is drawn from the central rod and the material forming the coating is simultaneously drawn from the tube surrounding the rod. In practice the diameter and uniformity of the drawn strand are largely governed by the temperature of the two glasses from which the strand is drawn, the rate at which the glass rod and tube are fed to the heated zone, and also the rate at which the fiber is drawn. When all of the factors are properly balanced, a supply of the two glasses is provided at the drawing point at the proper state of fluidity to permit the drawing of the desired constant diameter strand. Simultaneously as this supply is formed it is diminished by the withdrawal of the strand and replenished in accordance with the rate at which the tube and rod are advanced to the heating area or furnace. Interruptions or variations in the rate at which the strand is drawn are undesirable because of the resulting adverse effect upon the dimensions and uniformity of the drawn fibers.

Another problem which has been encountered in the manufacture of glass fiber bundles for use in the transmission of light and images, resides in the difficulty of applying the required degree of tension to the glass fiber as it is being simultaneously drawn from the molten supply and wound about the periphery of the rapidly rotating winding drum. In drawing and winding the fiber about the drum to form the successive layers, if the fiber forming any one layer is not in tight engagement with the surface of the drum or an underlying layer, it may become disarranged due to the disturbing forces which are generated by the cumulative effect of the next succeeding layers. The very small diameter fibers utilized do not have sufficient tensile strength to withstand the tension required to provide the desired tightness of the various layers. In practice it has hitherto been found to be extremely difficult to wind the multiplicity of layers about the winding drum with a satisfactory degree of tightness while at the same time avoiding breaks in the glass fiber.

In addition to the difficulties encountered in winding the drawn glass fiber with sufficient tightness about the winding drum, it has also hitherto proven to be exceedingly difficult, if not impossible, to maintain the required degree of precise alignment of the opposite ends of the fibers during the subsequent stages of manufacturing an image conducting device. While some small amount of misalignment may be tolerated, the magnitude of this problem may be better appreciated when it is understood that with fibers having a diameter of about .001 inch, misalignment of the individual fibers as small as about .0005 inch is objectionable for many uses.

Breaks in the glass fibers are undesirable as may be readily appreciated in view of their deleterious effect upon the efficiency of light and image transmitting devices. The presence of a break in the glass fiber on the winding drum has a further and aggravated effect because of the speed of rotation of the drum. Under the influence of centrifugal and air turbulence forces, loose ends resulting from breaks in the fiber are carried away from their intended position in the layer being wound and ultimately are often trapped in such manner that they extend across the turns of the fiber around the drum. This results in the formation of irregularities such as bumps and depressions which often have a magnified effect as successive layers are formed.

It is therefore a principal object of this invention to provide an improved method and apparatus for manufacturing light and image transmitting glass fiber bundles at high speeds and having markedly enhanced light and image transmission capabilities.

Another object is to provide such a method and apparatus by means of which such light and image transmitting fiber bundles may be manufactured with adjacent strands in exceedingly tight juxtaposed relation as is especially desirable at the ends of a fiber bundle.

A further object is to provide such a method and apparatus by which fiber bundles may be readily formed at high speed substantially free from the deleterious effects of broken fibers.

Another object is to provide glass coated glass fiber bundles characterized by improved light and image transmission as well as enhanced ruggedness.

The foregoing, as well as further objects and features of the present invention, will be apparent from the following detailed description and the accompanying drawings in which.

The method of the present invention is applicable to the manufacture of light or image transmitting fiber bundles by drawing of both a single composite glass fiber strand or two or more of such fibers and simultaneously winding the fiber or fibers about a winding drum. The present invention will be first described in connection with the making of a bundle of light conducting glass fibers by drawing a single composite glass fiber having a fiber glass core of one refractive index and a relatively thin glass coating uniformly fused over the entire outer surface of the core, the coating being formed of a different glass having a lower index of refraction than the glass fiber core.

As brought out in said copending application, a rod of optical glass having the requisite properties for forming the light conducting core of the composite glass fiber is surrounded by a tube of optical glass having a lower index of refraction than the glass forming the core. The glass rod and the surrounding glass tube are heated to the temperature at which a uniform composite fiber may be drawn therefrom, the core of the fiber being drawn from the glass rod simultaneously as glass from the tube is drawn so as to form a uniform coating over the entire surface of the core. This composite fiber which is first drawn from the glass rod is attached to a slowly revolving winding drum. The winding drum, once the fiber strand has been attached to it, is gradually brought up to normal winding speed. The initial turns of the glass fiber around the winding drum are formed in a discard region and the winding of the desired layers of glass fiber about the drum is not commenced until the apparatus has been in operation long enough for the formation of the glass fiber to be stabilized at the desired diameter. When the formation of the glass fiber is stabilized, the fiber is progressively advanced along the drum so that the turns of the fiber are formed about the winding area of the drum. As the winding operation continues the fiber is fed to the drum with the required amount of advance to lay down a solid layer with the adjacent turns in tightly juxtaposed relation. When the winding area of the drum has been covered with the fiber turns, to form a layer having the desired axial width, the fiber being fed is advanced axially so as to be laid down onto a discard area of the drum which is beyond the winding area in the direction of advance.

In order to insure that the turns of the glass fiber form a smooth, tightly packed layer about the winding drum, the length of glass fiber forming this first layer may be wet by suitable liquid. It has been found that with the extremely thin diameter fiber which is formed and handled in carrying out the present invention, the surface tension of the liquid with which the fiber is wet exerts sufficient force to cause the fiber to lay in place on the surface of the winding drum. For this purpose, the liquid utilized should be nonreactive with the material forming the surface of the winding drum and also should not react undesirably with the materials subsequently utilized in processing the glass fiber layers. A liquid such as acetone which is volatile and if present merely forms a nonreactive diluent of the resin or cement which is subsequently applied to the glass fiber layers has been found suitable.

Instead of wetting the fiber strand forming the turns of the first layer about the drum with a volatile liquid such as acetone, the surface of the first layer, after it has been laid down and before covering it with the turns forming the second layer, may be coated with a suitable liquid which serves to anchor the turns of the fiber forming the layer.

Assuming that the first layer was laid down by advancing the successively formed turns of the fiber from left to right axially along the winding drum, then for those uses where the registration and alignment of the fibers are not especially critical, the second layer may be laid down by advancing the fiber turns in the opposite direction, that is, from right to left. When this procedure is followed, alternate layers have a right-hand pitch while the remaining layers have a left-hand pitch and thus the fibers of adjacent layers cross one another but at a relatively small angle.

When the fiber bundle is to be utilized for transmitting images and particularly when such a device is formed from a single fiber which is wound to form the successive layers about the winding drum, it is preferable to form all of the layers about the winding drum with the same direction of advance. This is accomplished by returning the fiber at the completion of each layer to the starting region of the drum and during this return movement of the fiber it is kept free of the winding drum. It will be appreciated that any change in the rate at which the fiber is drawn from the hot glass supply causes a change in the conditions governing the diameter of the fiber being drawn which in turn causes irregularity in the diameter of the fiber. Such irregularities in the diameter of the strand of glass fiber are avoided by continuing to draw the fiber from the hot glass, while it is being returned to the starting end of the winding drum, at the same constant rate at which the fiber is drawn to form the successive layers. The length of fiber drawn during this retrograde motion is not used in forming any part of the successive layers and when returned to the starting end of the winding drum the fiber is attached thereto at the starting discard area and winding of the next layer is carried out. As before, the surface of the newly formed layer is coated with a suitable material in order to anchor the same to the underlying layer. This procedure is carried out until a sufficient number of layers have been laid down about the winding area of the drum to provide a total thickness of glass corresponding to one of the dimensions, to the width, of the fiber bundles which are to be formed.

If desired, the fiber drawn during the aforementioned retrograde movement may be utilized to form the successive layers on a second winding drum disposed alongside of and parallel to the first winding drum. In carrying out such an arrangement, the end region of the layers on the first drum is abreast of the start region of the layers on the second drum. Thus, upon the completion of a layer on the first drum, the fiber is transferred to the second drum and then advanced axially relative to it to form a layer. The advance of the fiber relative to the second drum is in the return direction with respect to the first drum so that on completion of the layer on the second drum the fiber is once again in position to be attached to the first drum for the laying down of the next layer thereon.

Preferably the return of the fiber from the end of one layer to the start of the next succeeding layer is carried out by attaching the fiber to a return roll having a diameter which is many times smaller than that of the winding drum and which is driven directly from the winding drum at a peripheral speed which is equal to that of the winding drum. This makes it possible to lay down successive layers in a more rapid sequence and facilitates maintaining the drawing speed constant.

The material utilized for coating the glass fiber layers may be any one of several resins or cements commercially available, such as epoxy resins. The resin or cement is preferably one which does not set so rapidly that it will prevent the fiber of succeeding layers from being drawn into close, tight-packed relation with the fiber of a preceding layer. It should set sufficiently in the time required to lay down about four layers to provide a sufficient anchoring effect so that successive layers deposited thereafter will not cause shifting of the fiber turns of the underlying layer. The material should be susceptible of being applied to form a coating which is thin relative to the thickness of the glass coating which is fused to the glass core of the fiber. A coating having a thickness as initially applied of about one-tenth the diameter of the glass fiber has been found satisfactory. An epoxy resin which has been found suitable is that sold under the designation Bond Master E-621 by Rubber & Asbestos Corp., Bloomfield, New Jersey. This resin is diluted sufficiently with a solvent so as to provide the aforementioned setting rate.

The anchoring material is applied, as by spraying, in such condition that its viscosity does not prevent but facilitates the fiber turns being drawn into the desired tightly packed relation. The anchoring material is forced from between the fibers, where they are brought into substantially tangential contacting relation, and into the small voids left open between the round fibers.

The anchoring material applied to the successively wound layers of fiber provides important advantages not only in minimizing the deleterious effects of breaks in the glass fiber and in serving to anchor the turns against displacement while it is being wound but also in connection with the removal of the fiber layers from the winding drum and in their subsequent handling. As the various fiber layers are wound on the drum the anchoring material sets progressively from the drum outward. When the layers are to be removed from the drum they and the multiplicity of individual fiber turns are essentially in the form of a unitary, solid, more or less rigid ring or cylinder on the winding drum with each fiber strand joined to its neighbors substantially throughout its length. After removal from the drum, the fiber layers are in the form of a solid ring or in the form of several solid ring sections which may be handled without disarranging or entangling the fiber strands.

Depending upon the subsequent processing of the fiber layers and the intended use of the fiber bundles to be made therefrom, the anchoring material may be set to such an extent that the fibers are completely immovable with respect to adjacent fibers. This is highly desirable when it is desired to produce image conducting fiber bundles in which the greatest degree of alignment and registration of the ends of the fibers are required. When light conducting bundles having fixed arcuate shapes are to be formed it may be desirable to provide a degree of set of the anchoring material which permits individual fiber strands to slide to a small degree relative to adjacent fiber strands. In this condition, the fiber layer ring or ring sections as removed from the winding drum are also essentially in the form of a solid, unitary body or bodies but are substantially more flexible.

As has been indicated, winding is terminated when a sufficient number of layers have been formed to provide a covering about the winding drum having a thickness corresponding to the thickness of the fiber bundles desired. Then, in preparation for removing the glass from the winding drum it is cut along one or more axially extending strips from end to end. Before cutting the glass fiber layers, the anchoring material is substantially completely set along the axially extending strips. In the case of a resin anchoring material it may be cured along these strips. Depending upon the length of the fiber bundles which are to be formed one or more such axially extending strips may be prepared for cutting. For example, if the length of the fiber bundles is to be the maximum obtainable from the particular winding drum utilized, then the fiber layers are cut only along a single strip. If the circumference of the winding drum is twice as long as the desired length of the fiber bundles, then the layers are cut along two strips 180° apart. Various lengths may be obtained by cutting along strips properly spaced about the circumference of the winding drum.

When the aforementioned epoxy resin is utilized as the anchoring material it is preferably cured so that it polymerizes along the axially extending strips where these layers are to be cut and is set substantially without polymerization between these strips. If desired the resin may be cured throughout the extent of the layers although this may make it more difficult to remove the resin from the fibers where desired.

Assuming that the fiber layers have been cut along two strips 180° apart, two substantially solid half rings or cylinders of glass layers are obtained with the fiber strands substantially rigidly set in place. The half rings of the glass fiber layers are now slit circumferentially to form individual fiber bundles having the desired width, each bundle being held intact by the set and/or cured resin. These strips of fiber bundles are now treated to remove the anchoring material from all but its end sections when it is desired to provide fiber bundles which are flexible intermediate their ends. For this purpose, all but the end portions may be immersed in a suitable material which serves to dissolve the anchoring material. When the anchoring material is an epoxy resin, a suitable agent for this purpose is a 95% solution of sulphuric acid heated sufficiently to dissolve the resin. This serves to free the individual fibers except for the bonded end portions thereof. After neutralizing such reagents as may remain on the glass fibers and washing the same, the bundles are dried.

The end faces of the bundles are optically polished to provide suitable faces at the ends of each of the glass fibers. Polishing of the end faces may be carried out whenever convenient, as for example, before removal of the anchoring material or afterwards, or even after the fibers have been lubricated as will now be pointed out.

It will be appreciated that the glass fibers are relatively fragile, and when the flexible bundles are manipulated adjacent fibers are brought into contact with each other and are rubbed one against another. Both, in order to facilitate manipulation of the bundles and also to protect the individual fibers, a lubricating fluid or substance which may be any suitable oil is utilized. When, as will be described, the fiber bundle is to be encased in a covering of latex then a silicone oil is preferably used. This is applied by immersing the unbonded portions of the fibers preferably in the oil after the fibers have been washed and dried. Care is taken to avoid the formation of only a thin film of the lubricant on the glass fibers because in that event the surface tension of the oil may result in the extremely thin fibers being held together so that the flexibility of the fiber bundle is reduced and the likelihood that fibers may be broken is increased. Such difficulties are avoided by enclosing all but bonded end portions of the fiber bundle in a fluid tight exible enclosure, such as may be readily formed from latex which is filled with the oil to such an extent that the loose fibers "float" in the oil.

Figure 1:
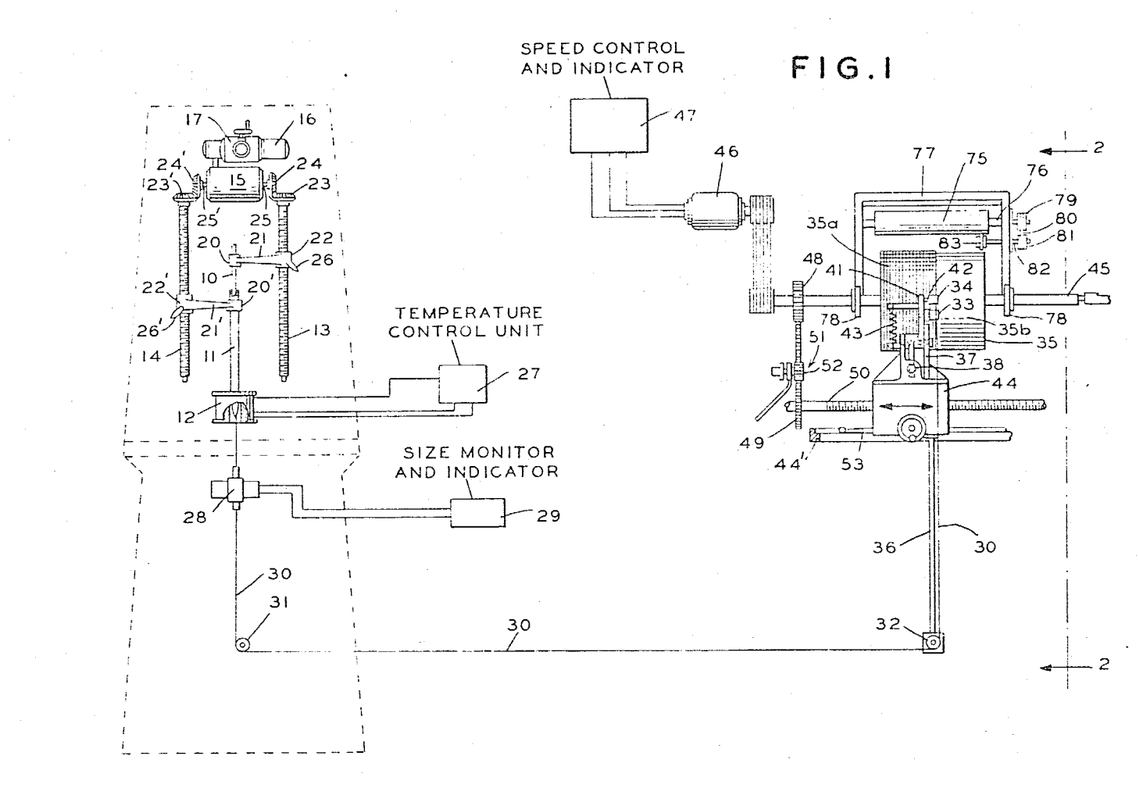
FIGURE 1 is a front elevational view of a preferred apparatus for carrying out the method of the present invention.
Figures 2, 3:
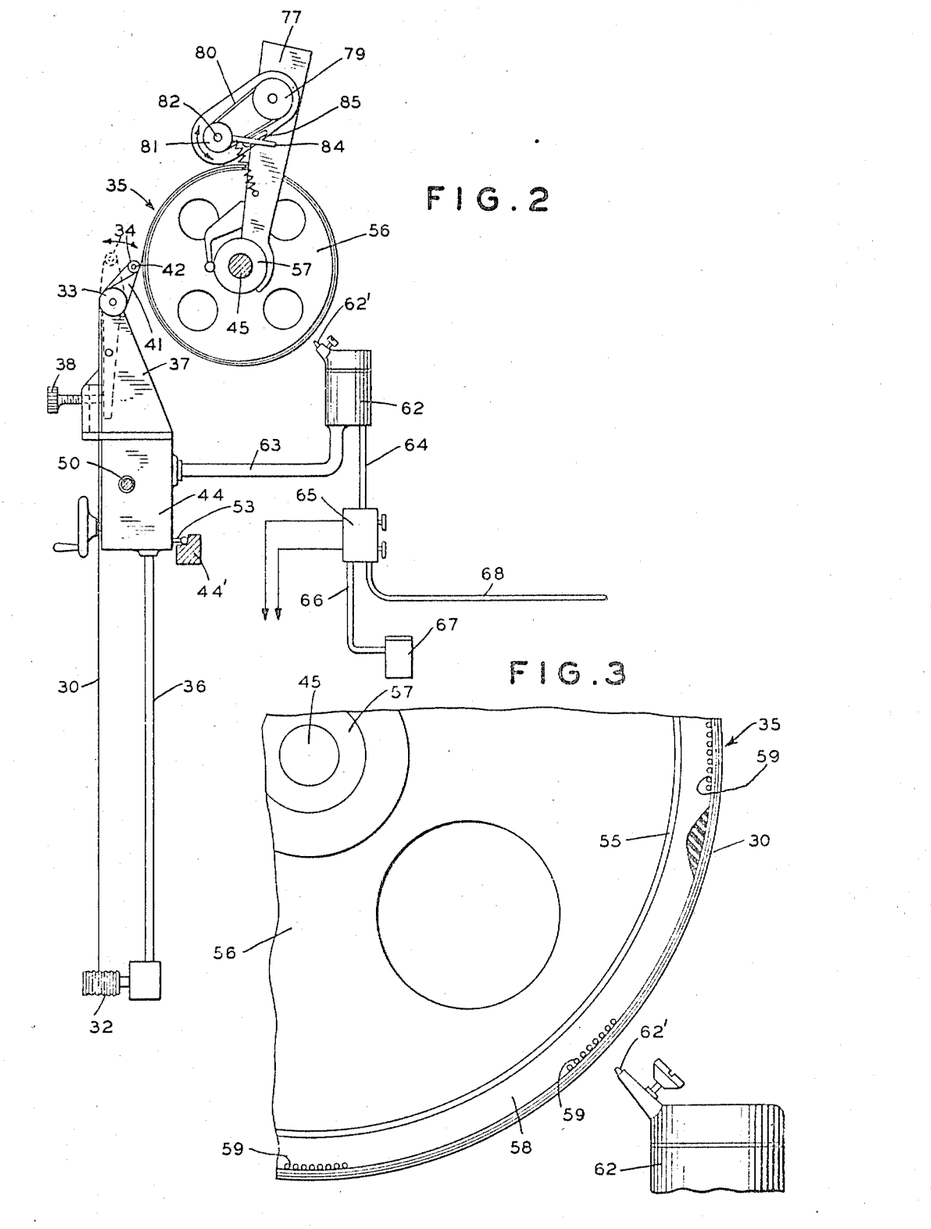
FIGURE 2 is a side elevational view taken from the point of view of the line 2—2 in FIGURE 1.
FIGURE 3 is an end view of an enlarged scale of a portion of the winding drum shown in FIGURE 1.

Turning now to FIGURES 1-3, an embodiment of the process of this invention will now be described in connection with a preferred apparatus for carrying out the same. A solid glass rod 10 which may be about 1 inch in diameter extends within a glass tube 11 and both are fed axially along through an electrically heated furnace 12. While the arrangement shown in said copending application may be utilized, uniform results may be more readily achieved when provision is made as in the present instance, for adjusting the relative rate of feed of the two glasses. For example, where the ratio of the thickness of the glass coating to the diameter of the core of the fiber 30 is equal to the ratio of the thickness of the wall of tube 11 to the diameter of rod 10 and both ratios are about ⅛, the tube 11 and the rod 10 may be fed at the same rate. Because the required thickness of the glass coating is a constant independent of the fiber size, the proportion of coating glass from the tubing may be adjusted by increasing or decreasing the rate of feed of the tube relative to the rod depending upon whether the tube wall thickness is less or greater than the value for which the rates of feed are equal. Thus, the glass rod 10 and the glass tube 11 are advanced independently by a pair of threaded shafts 13 and 14 driven through an adjustable differential drive 15 which is in turn driven by a variable speed motor 16 through a suitable reduction gear box 17. The glass rod 10 is clamped in a collar 20 on the end of an arm 21, the opposite end of which carries a collar 22 which releasably engages the threaded portion of the shaft 13. A bevel gear 23 fixed to the upper end of shaft 13 engages a bevel gear 24, which is in turn fixed to the output shaft 25 extending from one end of the differential drive 15. Suitable bushings and supports (not shown) are provided as required. A clamp 26 facilitates releasing collar 22 from engagement with the thread of shaft 13 so that the arm 21 and the glass rod 10 supported thereby may be positioned as desired relative to the furnace 12 at the start of operation.

A similar arrangement of parts is provided for supporting glass tube 11 from shaft 14 and for driving the latter, which parts for simplicity have been designated by corresponding reference characters with a prime added. Thus, shaft 14 driven from the output shaft 25 of the differential drive 15, through meshing bevel gears 23', 24'. The glass tube 11 is clamped in a collar 20' carried on one end of the arm 21', the other end of which terminates in a collar 22' which engages or is free to slide over the threaded portion of shaft 14 depending upon the position of clamp member 26'.

The glass rod 10 from which the fiber core is drawn may be formed of any suitable high quality optical glass. Taking into account the index of refraction and the softening point of the glass forming rod 10, a high quality glass is selected for use in the tube 11 which forms the coating fused to the surface of the core of the fiber 30. As is known, the glass forming the fiber core should have a higher index of refraction than that forming the coating. While a wide variety of glasses may be utilized an index of refraction of approximately 1.68 for the core glass and an index of refraction of about 1.52 for the coating glass provides good results although glasses having other indices of refraction may also be used. The glasses should be such that when heated as will be described with the glass rod 10 inside the glass tube 11, they each attain substantially similar viscosities. The coefficients of expansion of the two glasses utilized should be the same or sufficiently matched to avoid the development of internal forces which may lead to fracturing of the fibers.

The furnace 12 is positioned so that the rod 10 and the tube 11 may be inserted axially into its open upper end. The heater coils of the furnace 12 are connected in the conventional way through a temperature control unit 27 to a source of electrical power through contacts which respond to a temperature sensing device such as a thermocouple mounted in the furance. Such arrangements are well known and a detailed description thereof is not considered necessary. Suffice it to say that the arrangement functions automatically to maintain a desired temperature within the furnace.

The fiber 30 which is drawn downward out of the furnace 12 passes through a diameter inspecting or sensing unit 28 and then over a system of pulleys, yet to be described to a winding drum 35.

Sensing unit 28 is part of a conventional fiber diameter measuring and indicating systems 29 of the type in which the fiber passes between a photoelectric device and a light source, the photoelectric device providing an output representative of the diameter of the fiber.

The fiber passes downward from the sensing unit 28 and partially about a pulley 31 from which it passes horizontally to a pulley 32. From pulley 32 the fiber travels vertically partially over a pulley 33 and under a pulley 34 on to the winding drum 35. When the fiber being drawn has such a low tensile strength as not to be able to withstand the drag of the pulleys, the pulleys may be air-driven or otherwise driven to avoid breaking the fiber. When a plurality of fibers are drawn simultaneously as will be more fully pointed out hereinafter the combined tensile strength of all the fibers may be effective to overcome the drag of the pulleys.

As shown, pulleys 32, 33 and 34 are mounted in vertically alingned relation and are supported from a movable feed cariage 44. Pulley 32 is rotatably supported by a rigid support member 36 while pulley 33 is rotatably supported on a frame member 37 carried by the carriage 44. While pulleys 31, 32 and 33 are mounted for operation in mutually fixed relation, the pulley 34 is mounted for displacement between two positions, one in close spaced relation with the drum 35 and the other away from the surface of the drum. For this purpose pulley 34 is rotatably mounted on one end of an arm 41 mounted to rock about a shaft 42, connected to frame member 37, between one position in which the pulley 34 is closely adjacent to winding drum 35 and a second position, shown in broken lines in FIGURE 2, in which the pulley 34 is away from the drum 35. A spring 43 is connected at one end to the arm 41 adjacent to pulley 34 and the other end of this spring is anchored to frame member 37 below and in relation to the shaft 42 so that it serves to urge the pulley 34 into the selected one of its two positions. When the pulley 34 is in juxtaposed relation with drum 35, the opposite end of the arm 34 engages the end of an adjustable stop 32, mounted in the frame member 37, which is adjustable to precisely position the pulley 34 relative to the winding drum 35.

The winding drum 35 is mounted for rotation on a shaft 45 driven by a motor 46. The coupling between the shaft 45 and the motor 46 is arranged to minimize any possibility of undesired variations in the rate of rotation of the shaft. The motor 46 is connected to the electrical supply through a variable speed controller and indicator 47 by means of which the output speed of rotation of the motor shaft and in turn the speed of rotation of the shaft 45 may be precisely controlled from start up to normal operating speed.

Fixed to shaft 45 for rotation therewith is a gear wheel 48 which serves to drive a gear wheel 49 fixed to feed screw 50 through a gear train indicated generally at 51 which includes a variable gear box 52 by means of which the rate of rotation of the feed screw 50 may be varied in relation to the rate of rotation of the shaft 45.

The feed screw 50 extends parallel to the shaft 45 and supports the carriage 44 which is mounted to slide along a rail 44'. Any one of the various well known arrangements may be provided in the carriage 44 so that it is traversed to the right or left relative to the drum 35 (as viewed in FIGURE 1) depending upon the position of a selector handle 53.

The winding drum 35 comprises a cylindrical shell 55 secured to and supported on radial members or spiders 56 provided with axially disposed hubs 57 (FIGURE 3) by means of which the drum is fixed to the shaft 45. The outside surface of the shell 55 is coated with about a one-half inch thick layer 58 of resin built up with layers of porous material such as an open weave fabric. The outer portion of the resin layer 58 is free of the porous material so that the surface thereof may be precisely shaped to form a cylindrical surface. The winding drum as thus formed with the resin coating 58 has unexpectedly been found to greatly facilitate the winding of the glass fiber with the required precision as compared to a drum having a metallic winding surface.

The resin layer 58 provides a good heat barrier which facilitates heating the resin anchoring material coating the glass layers laid down thereon where it is desired to cut the glass layers in order to obtain fiber bundles of the required length. For this purpose heating elements 59 are readily imbedded on the surface of the resin layer 58. Heating elements 59 are shown exaggerated in size in the drawing but are preferably of relatively small thickness, about 0.001", and are readily pressed into the surface of the resin layer 58. When it is desired to accelerate the curing of the resin coating the fibers of the layers wound on the drum, the heating elements 59 are connected to a suitable electrical power supply while winding drum 35 is either stationary or rotating. Temperature-responsive thermocouples are positioned with each of the sets of heating elements 59 spaced around the periphery of the resin coating 58 and are connected to a suitable temperature controller (not shown) which governs the supply of electric current to the heating elements 59.

As has been indicated, the glass fiber 30 is threaded under the spool 34 to pass onto the surface of the winding drum 35. The latter is driven clockwise as viewed in FIGURE 2 and a freshly wound turn of the glass fiber is carried on the drum to where it is exposed to a spray of anchoring material from sprayer 62. Sprayer 62 is connected to and is movable with carriage 44 by means of a support arm 63. The sprayer 62 communicates through pipe 64 to a metering unit 65 which in turn communicates through pipe 66 with a source 67 of liquid resin in the present instance and through conduit 68 to a supply of air under pressure (not shown). If desired, the metering unit 65 may be linked with shaft 45 so as to be driven in step with the rotation of drum 35 to supply the desired amount of resin in the form of a spray. Preferably the metering unit 65 is electrically driven and is adjustable to provide the desired concentration of resin in the spray at a rate conforming to the speed of rotation of the winding drum 35.

In operation, as each turn of the glass fiber is being wound on the drum 35, it is carried past the sprayer 62 where a thin film of the resin is applied thereto and as the drum continues to rotate, the resin coating of this turn and the turns previously wound air dry to increase its viscosity sufficiently to provide the desired anchoring effect. It is to be noted that the nozzle 62' of the sprayer is small and is positioned to direct its spray locally upon only a small number of the glass fiber turns. Being movable with the carriage 44, the sprayer 62 stays in alignment with the advancing edge of the fiber layer being formed and continually coats the same with the desired resin film. Thus, the already formed portion of the fiber layer gradually emerges from the sprayed zone and the air has its full drying effect on the previously deposited resin.

Preparatory to winding the glass fiber, the surface of the winding drum 35 is covered over the entire winding zone with a suitable release material. Fiber 30 may be wound directly upon the resin layer 58 on the surface of the shell 55. In that event, the resin layer 58 is coated with grease or the like in order to prevent the resin coated glass fibers from bonding thereto. Preferably the surface of the resin layer 58 is lightly oiled and then a thin sheet 60, such as a plastic sheet of about .00025" thick Mylar, is wrapped around the surface of the drum which serves both to protect the electrical heating elements 59 and also to prevent bonding of the fiber layers to the resin coating 58. The sheet 60 may be formed of other materials that have the required strength as a sheet having a thickness less than that of the thickness of an individual fiber, for example steel or other metal foil may be used.

The lower ends of the glass rod 10 and tube 11 are heated in the furnace 12 to drawing temperature. The temperature of the glass at which the drawing is carried out may vary depending upon the type of glass utilized. In any event the glass is heated short of what is considered the start of its normal working temperature range in conventional glass practice which corresponds to a viscosity of about $10^4$ poises. In carrying out the present invention, the preferred temperature range is one at which the glass just begins to deform under its own weight or under the influence of gravity but does not flow freely. In this condition the glass has a viscosity ranging between about $10^5$ and $10^6$ poises. It is preferred to draw the fiber 30 with the glass of rod 10 and tube 11 in this condition because if both glasses are at a higher temperature and lower viscosity it is extremely difficult if not impossible to obtain the required optically sharp interface between the coating glass and the underlying core glass in view of the tendency of the two glasses to mix or dissolve in one another. It should be noted that while either the core glass or the coating glass may be substantially less viscous at least one of them must have the relatively high viscosity at the drawing temperature of about $10^5$ to $10^6$ poises. Furthermore, a difference in the viscosities of the two glasses at the drawing temperature of no more than about a factor of 10 may be tolerated.

At the temperature the fiber 30 is drawn, the lower ends of the rod 10 and tube 11 are readily tapered so that the fiber 30 may be drawn therefrom and threaded through the sensing unit 28 and past the spools 31, 32, 33 and 34 to the drum 35. At this time, the spool 34 is retracted away from the surface of the drum 35 and the fiber 30 is attached to the starting discard area 35a of the drum on which a film of tacky resin or other suitable adhesive is provided. The pulley 34 may now be brought to its position close to the surface of the drum 35 and the winding drum is brought up to normal winding speed which serves to draw the fiber at a linear speed of about 40 to 60 feet per second. The fiber 30 is wound about the start discard zone 35a until the indicator 29 shows that the diameter of the fiber is stabilized at the dimension desired.

The carriage 44 is then advanced along the feed screw 50 so that the fiber 30 is now laid down in turns around the central, winding zone of the drum 35 and the selector handle 53 is shifted so that rotation of the feed screw 50 serves to advance the carriage 44 along its feed slide 44 at the desired rate to form the turns of the fiber in tight side-by-side relation about the drum with the desired pitch.

As the fiber is wound about the drum 35 to form the first and subsequent layers, the advancing end of the layer is coated with a spray of resin from the sprayer 62, which is then set by drying in the air which moves past the rotating drum.

The laying down of the successive turns of fiber to form the layer is continued until a layer of the desired width has been formed. Thereafter, additional turns of the fiber 30 are formed about the end discard area 35b, preparatory to returning the fiber to the starting end so that the next fiber layer may be laid down on the drum with its turns in parallel with the turns of the preceding layer. In the present embodiment this is carried out by transfer means now to be described in detail.

A cylindrical auxiliary roll 75 which may be somewhat longer than the drum 35, has a diameter which is several times smaller than that of the drum 35 and is fixed to a shaft 76 rotatably supported in a C-shaped frame 77. The free ends of the frame 77 are supported on bearings 78 fixed to the shaft 45 adjacent opposite ends of the drum 35.

One end of the shaft 76 extends through the frame 77 and carries a pulley 79 driven by a belt 80 which runs over a pulley 81 fixed to the end of a short shaft 82. The shaft 82 is swingably supported from the frame 77 on an arm 84 and at its free end carries a wheel 83. Normally the frame 77 is positioned on its bearings 78 with the wheel 83 not in engagement with the surface of the drum 35, the arm 84 being engaged by a latch 85.

In order to carry out the transfer of the fiber 30 from the end discard region 35b to the start region 35a, the latch 85 is released to bring the wheel 83 into rolling engagement with the marginal end portion of the winding drum 35 whereby the wheel 83 is rotated. The rotation of wheel 83 is transmitted through shaft 82 and the belt and pulleys to shaft 76 and the auxiliary roll 75 is thereby rotated at substantially the same peripheral speed as that of drum 35. The pulley 34 is withdrawn from the drum 35 with the result that a length of the fiber 30 extends through the space therebetween. The surface of the roll 72 having been made tacky as by spraying with resin, the frame 77 is rotated counter-clockwise, as viewed in FIGURE 2, to bring the surface of the rotating roll 75 into engagement with the fiber 30. On engagement of the glass fiber with the tacky surface of the roll 75, the latter picks up the fiber, which is now wound about the roll 75 instead of about the drum 35, and it continues to be drawn from the furnace 12 at the same constant speed as before. The carriage 44 is now shifted back along the feed screw 50 to carry the fiber 30 into alignment with the starting discard zone 35a and, when so aligned, the pulley 34 is once again brought forward toward the tacky surface of the start discard zone 35a. This causes the length of fiber 30 between the pulley 34 and the roll 75 to touch and adhere to the tacky surface 35a. The fiber now winds about this zone of the drum 35 and the fiber connected to the roll 75 is broken. The transfer frame 77 is now shifted back to its normal rest position with the wheel 83 free from the drum 35.

Several hundred or more fiber layers may be thus formed in succession about the winding drum depending upon the thickness and type of the fiber bundles formed therefrom. During or upon termination of the winding operation the resin coating the fiber turns forming the multiple layers is cured by energizing the desired electrical heating elements 59.

Figures 4, 5, 7:
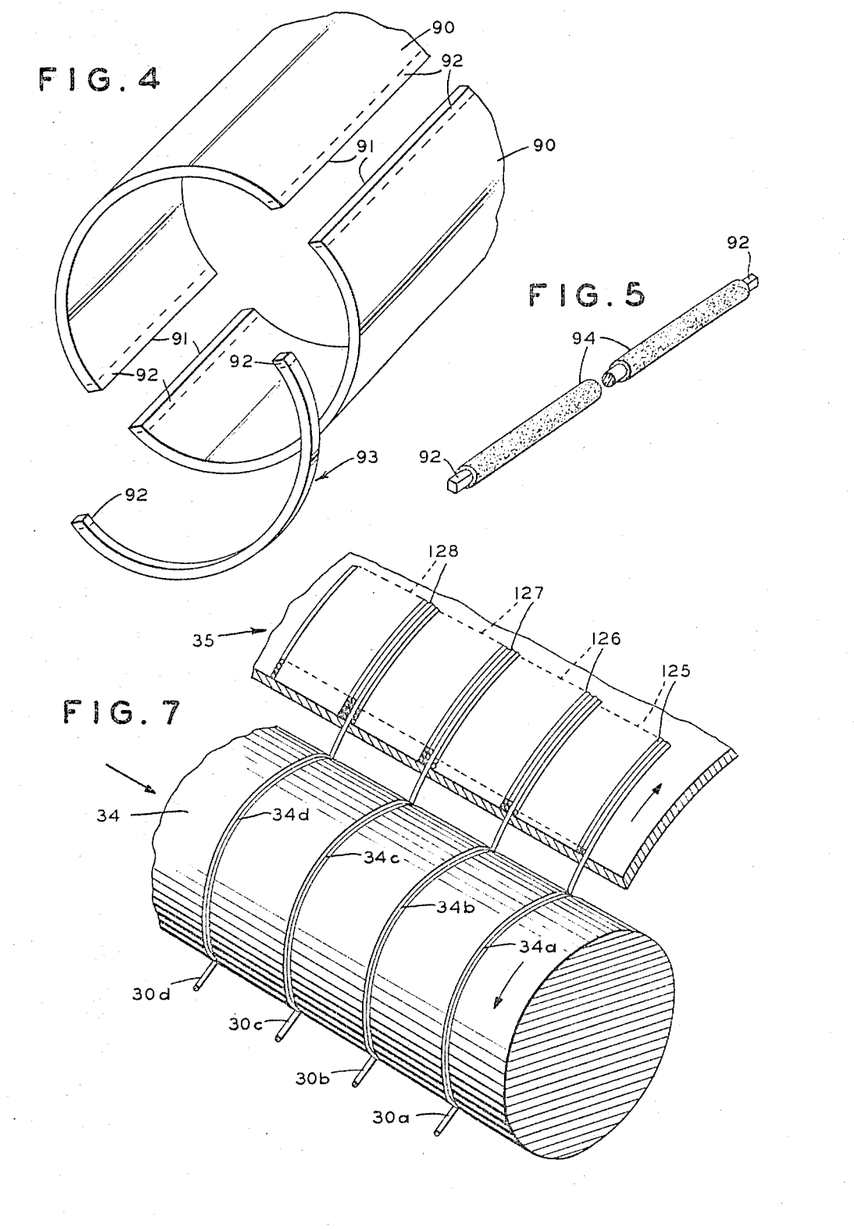
FIGURE 4 is a perspective view showing the wound glass fiber layers after removal from the winding apparatus.
FIGURE 5 is a perspective view of an optical glass fiber bundle, partially broken away for convenience.
FIGURES 6 and 7 are perspective views of apparatus useful in simultaneously drawing and winding a plurality of glass fibers.

When the selected axially extended strips have been cured the layers are cut through along these strips and the several arcuate sections are removed from the winding drum. In the present instance where the layers are cut along two lines 180° apart, two solid, relatively rigid half cylindrical sections 90 are formed as shown in FIGURE 4. The fibers in these half rings or shells 90 extend circumferentially between the edges 91 and the marginal portions 92 of these fibers are bonded together by the cured resin. These half rings 90 may now be slit circumferentially to form fiber bundles 93 of the required thickness.

The processing of the fiber bundles may be carried out as has been described to remove the uncured resin from the fibers intermediate the bonded end portions 92 thereof. The loose fibers of the bundle may be immersed in a silicone oil in a latex sheath 94, the ends of which are secured in fluid tight relation to the projecting bonded fiber portions 92.

Figure 6:
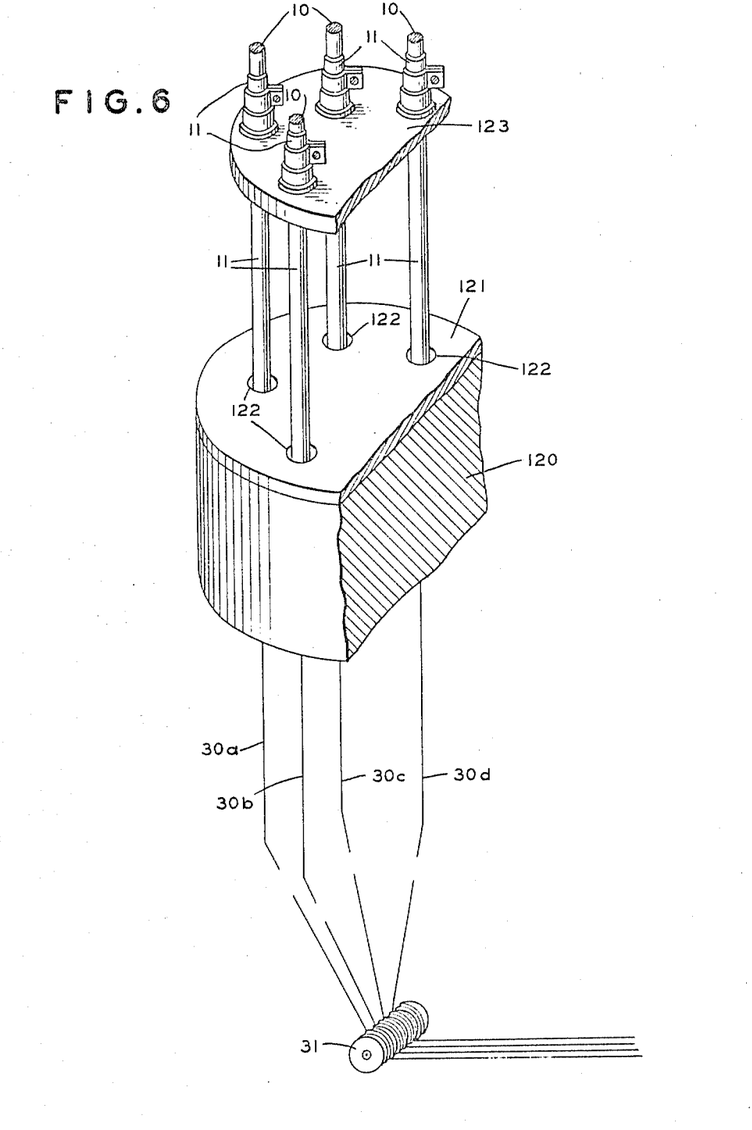

In accordance with a further feature of the present invention a plurality of glass coated glass core fibers 30 are simultaneously drawn and wound on the winding drum. The process readily lends itself to the simultaneous drawing of as many as 6 or more fiber strands. Four such fibers 30a, b, c and d are shown in FIGURE 6 as being drawn simultaneously from an electric furnace 120 which is somewhat larger than the furnace 12 previously described herein. The furnace 120 is provided with a cover 121 formed with a plurality of apertures 122 to receive and align the lower end portions of the glass rods 10 and their enclosing tubes 11. These glass tubes and rods may be supported by a clamp 123 which in turn may be mounted on the arm 21 for movement along the threaded shaft 13. In such an arrangement, all of the glass tubes and rods are fed simultaneously and at the same rate to the furnace 120. In the event variations as in the dimensions of the various glass rods and/or the glass tubes necessitate feeding at different rates, then all of the glass rods may be fed at one speed and all of the glass tubes may be fed at another speed as was described in connection with FIGURE 1. Furthermore, if desired, each of the glass tubes and each of the glass rods may be fed individually and the individual feeding rates may be adjusted as desired.

While only four fibers are shown as being drawn in FIGURE 6 it is to be noted that this in intended solely by way of illustration and a larger number of fibers may be simultaneously drawn.

The fibers may all be passed through the diameter sensing head of a diameter measuring and indicating system 29 and then drawn around the pulleys 31, 32, 33 and 34 as was described in connection with the single fiber strand 30. For the purpose of handling such a multiplicity of fibers the pulleys 33 and 34 are provided with a plurality of parallel annular grooves which are spaced apart relatively widely as compared with the diameter of the fibers being drawn as is best shown in connection with the pulley 34 in FIGURE 7. If desired, pulleys 31 and 32 may also be formed with similar annular grooves.

Drawing of the multiple fibers is carried out essentially in the same manner as has already been described in connection with the drawing and winding of a single fiber strand except that now the multiple fiber strands are led past the pulleys and are attached to the start winding zone 35a of the winding drum. Each of the fibers is brought into its own pulley groove and thus, on pulley 34, the fibers 30a–d ride respectively in the grooves 34a–d. Once each of the glass fibers has been attached to the starting zone 35a the pulley 34 is brought into juxtaposition with the surface of the drum and winding of the fibers in the central winding zone of the drum is begun by the fiber 30a winding a first fiber layer 125. The fiber 30b winds the second layer 126 over the first layer 125 and the fibers 30c and d form the layers 127 and 128 in similar relation with the leading edge of each succeeding layer trailing behind the preceding layer by a distance equal to the spacing of the grooves 34a–d from each other.

As shown, a series of superposed layers are formed one on top of the other with the leading edge of an underlying layer being just ahead of the next overlying layer. In FIGURE 7, the layers 125–128 are seen at an intermediate stage during the drawing and winding operation. Winding is continued into the end discard zone 35b until the winding zone has been completely covered with all of the superposed layers in the group being simultaneously formed. Then the direction of travel of the carriage 44 may be manually or automatically reversed so that it returns to the left along its feed screw 50, laying down a second series of multiple, superposed layers of fibers over the winding drum 35. The direction of motion of the carriage 44 is again reversed when all of the fibers have been carried into the start discard zone and a third set of superposed layers is laid down along the winding drum. The carriage 44 is repeatedly traversed back and forth along its feed screw until the desired depth or number of fiber layers have been formed.

It should be noted that during the formation of each of the superposed fiber layers they are each coated with resin from the sprayer 62 as was described hereinabove.

Upon the completion of the winding of the multiple fibers the treatment and processing of the glass fiber layers to form the optical fiber bundles is carried out in the same manner independent of whether they were formed by winding a single fiber or a plurality of fibers.

In the formation of image conducting fiber bundles in which the mutual relationship of the fibers at one of the ends of the bundle must be duplicated at the opposite end, satisfactory results are obtained when a relatively large number of fibers are drawn and wound simultaneously even though successive groups of the layers thus formed about the winding drum are wound in opposite directions. That is to say, alternate groups of layers have a right hand pitch and the remaining, intermediate layers have a left hand pitch. When greater precision is desired, each of the succeeding groups of layers may be wound in the same direction so that all of the layers have the same pitch. This may be readily done by breaking the fibers after winding has been carried into the end discard zone 35b and then returning the fibers to the start discard zone 35a, as for example by attaching the fibers to the transfer roll 75 as was described in connection with a single fiber. In this way, all of the layers in the winding zone are laid in the same direction while traversing the feed carriage 34 from left to right as viewed in FIGURE 1.

The present invention makes possible optical fiber bundles having widely varying dimensions and shapes. As has already been described, the fiber bundles 93 as initially formed are square or rectangular at their ends depending upon the size of the strips cut from the half rings 90. When the ends of the fibers in the bundle 93 have been bonded together by means of the cured resin, the bundle may be shaped as desired, without disturbing the orientation of the fibers at the opposite ends, by drilling or cutting operations on the bonded portions and then removing the unwanted fibers. This is preferably carried out before the unpolymerized resin has been removed from the fibers.

Figure 8:
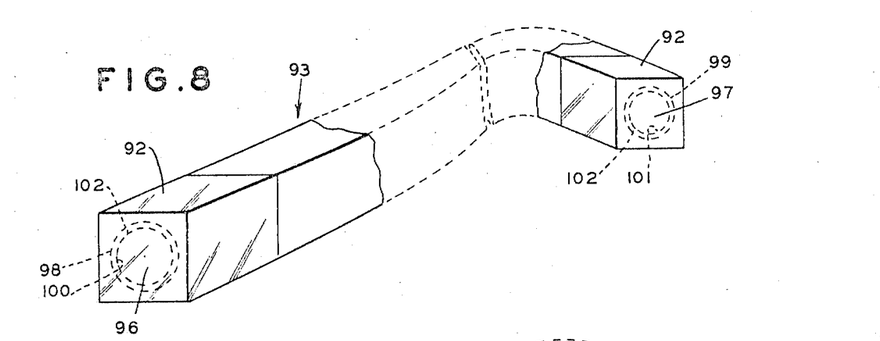
FIGURES 8 and 9 are perspective views showing a combined light and image conducting optical glass fiber bundle in different stages of manufacture.
Figure 9:
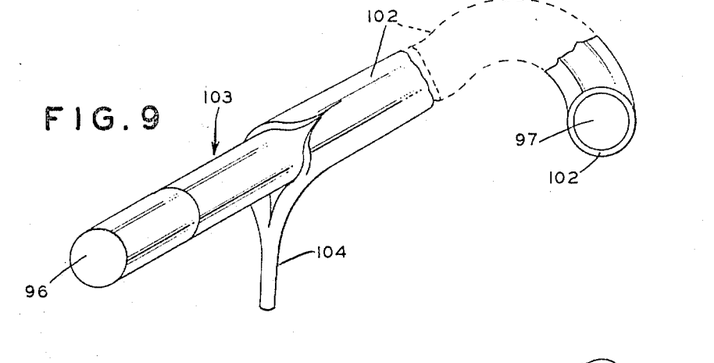

As will now be described in connection with FIGURES 8 and 9, a fiber bundle 93, after being separated from its parent half-ring 90, may be formed into a unitary concentric image and light carrier by cutting and shaping it, preferably before the set but unpolymerized resin has been removed from the fibers intermediate the bonded end portions 92. A first circular cut is made as indicated at 98 and 99 into each of the opposite end faces 96 and 97. These circular cuts extend back through the entire length of the bonded regions 92 and the fibers outside of these circular cuts are removed. These cuts 98 and 99 are carefully oriented so that the fibers within the circle of the cut 98 are also included within the circle of the cut 99. This serves to provide the exterior of the bundle of fibers with a desirable annular shape. A second circular cut as indicated at 100 and 101 of somewhat smaller diameter than the cuts 98 and 99, is made into each of the opposite end faces 96 and 97. Again, these cuts are carefully aligned and oriented with respect to each other so that the fibers which are segregated into an annular ring 102 include the same fibers at both ends of the bundle while leaving the remaining fibers in undisturbed relation in the end faces 96, 97. Adjacent to the end 96, the annular fiber ring 102 is readily split into relatively small axially extending segments. A solvent such as acetone may then be added to these segments to reduce the viscosity of the set resin so that the fibers in these segments can slide relative to one another when they are bent. The segments may then be readily peeled back axially along the fiber bundle and then brought together on one side of the image-carrying portion 103 of the bundle to form a generally cylindrical rod-like extension 104. The end portions of the glass fibers in the rod-like extension 104 are held together in clumps by the resin which was cured prior to the removal of the fibers from the winding drum. Additional resin or other suitable adhesive is applied to these end portions which are then bonded together and shaped to provide an end face suitable for receiving light.

The light and image-transmitting bundle is processed as has already been described to remove the unpolymerized resin. As before, the fiber bundle may be encased in a protective sheath wherein the loose fibers are immersed in a suitable lubricating fluid. After the end faces have been optically polished, light from a suitable source may be projected onto the end face of the rod-like member 104 and this light is conducted along the annular array of fibers 102 to illuminate a field of view adjacent to the end face 97. Light reflected by the field is conducted back along the fibers of the image-conducting portion 103 of the bundle to form an image of the field which may be viewed directly on the end face 96. If desired, various lens systems may be utilized at the ends of the image-carrying portion 96 to facilitate visualization of a desired area.

The forming and shaping of the optical image fiber bundles is preferably carried out, as was described in connection with FIGURES 8 and 9, while the resin on the fibers intermediate the cured sections 92 is sufficiently set so that the individual fibers cannot move relative to one another. However, if desired, the fibers between the bonded end portions may be freed of the unpolymerized resin and then dried before being conformed to the desired shape and configuration. In this condition the bundle is anchored by means of molds or clamps and then impregnated with an adhesive of sufficiently low viscosity to penetrate completely throughout the fibers where they are to be bonded and maintained in fixed relation.

Extremely thin optical fiber bundles may also be provided. When such thin fiber bundles as about .02" in thickness are desired having a greater width, a sufficient number of layers of the fiber may be formed on the winding drum so that the combined depth of all of the layers on the drum conform to the desired thickness, about .02". The fiber layers are removed from the winding drum and processed as before except as will now be described. The fiber layers are laid down on the drum to a depth of .02" and after having been treated as described, the mass is removed together with the underlying sheet 60, preferably of .00025" plastic as has been described, which is retained with the fibers adhered thereto to increase the strength of the bundles to be formed. This is then cut into strips of the desired widths which may be then shaped or molded as desired. To facilitate this shaping or molding, the resin anchoring material sprayed onto the fiber layers while they are being wound may have sufficient solvent added to its so that the resulting bundles are pliable. Additional solvent may be added to the fiber bundle strips before they are shaped. The unpolymerized resin may be removed from intermediate the ends of the bundles or the resin may be cured throughout to provide rigid optical fiber bundles.

Figure 10:
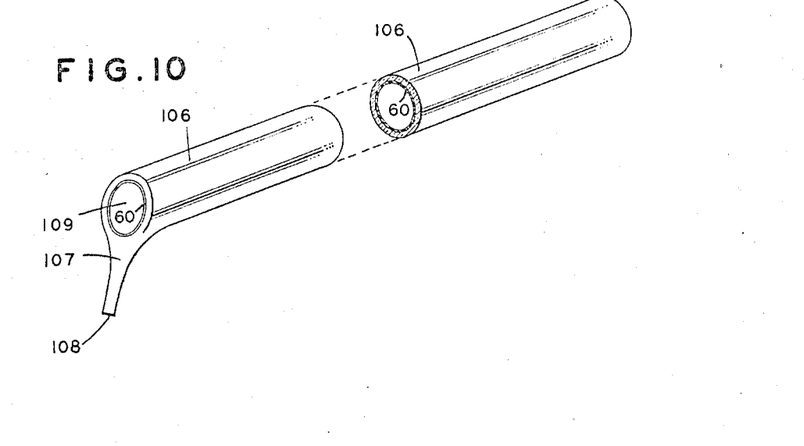
FIGURE 10 is a perspective view of another form of optical glass fiber bundle.

For example, a suitable width of such a thin strip of fibers may be rolled to form an annular hollow light carrier 106. If desired, the light carrier 106 may be cylindrical from end to end, or as shown in FIGURE 10, it may be formed with a rod-like portion 107 in which the fibers are brought together to form a solid end face 108, leaving an opening 109 on the axis of the bundle 106 through which a viewing device may be inserted and disposed axially. After being shaped, the unpolymerized resin in the bundle 106 may be cured to provide a rigid structure.

Solid optical bundles may also be formed from the very thin thickness of glass fibers supported on the plastic sheet. For example, the sheet of fibers and plastic may be rolled or folded to form desired cylindrical, rectangular or other solid shapes. The tendency of the bonded end sections to fracture parallel to rather than through the glass fibers facilitates such shaping, and when necessary, the end portions may be readily bonded to secure them in place. After the desired shape has been achieved the unpolymerized resin may be cured to provide a rigid bundle.

It is to be noted that while epoxy resins have been found to be best suited for use in carrying out the process of the present invention and in providing the best results in shaping and forming the optical fiber bundles, other adhesives which may be either thermoplastic or thermosetting may be utilized.

The terms and expressions which have been employed are used as terms of description and not of limitation, and there is no intention, in the use of such terms and expressions of excluding any equivalents of the features shown and described or portions thereof, but it is recognized that various modifications are possible within the scope of the invention claimed.

What is claimed is:

1. The method of making an image and light-conducting fiber optic device having a large number of extremely thin light-conducting coated glass fibers arranged at their ends in side-by-side aligned relation, which comprises (1) laying down a plurality of strands of flexible coated glass fiber in substantially side-by-side aligned relation to form a layer, (2) applying an adhesive fluid to said layer, repeating steps 1 and 2 to form a plurality of superposed glass fiber layers while allowing said adhesive throughout said layers progressively to set sufficiently to hold the glass fiber strands and the layers formed thereby in substantially immovable relation one to another, cutting the thus formed adhesively united layers substantially parallel to the glass fiber whereby to form a bundle containing a plurality of aligned glass fibers extending in substantially side-by-side and superposed relation with the glass fibers held by said adhesive in substantially immovable relation and with the opposite ends of said fibers forming the opposite end walls of said bundle, freeing the end portions of an array of said glass fibers at one end of said bundle from the remainder of said glass fibers, and gathering said freed end portions together on one side of said bundle and adhesively uniting the same to form a third end wall adjacent to one end of said bundle, whereby light incident on said third end wall is conducted to the opposite end of said bundle along said array of glass fibers.

2. The method of making an image and light-conducting fiber optic device having a large number of extremely thin light-conducting coated glass fibers arranged at their ends in side-by-side aligned relation, which comprises (1) laying down a plurality of coated flexible glass fiber strands in substantially side-by-side aligned relation about a drum to form a layer, (2) applying a polymerizable resin bearing liquid to said layer in an amount small enough so that the surface tension of said liquid serves to draw the glass fiber strands in said layer together, repeating steps 1 and 2 to form a plurality of superposed glass fiber layers about said drum while allowing said resin to set progressively throughout the thus formed succession of superposed layers, said resin setting sufficiently to form said layers into a substantially rigid mass with the glass fiber strands thereof anchored in substantially immovable relation, polymerizing said resin along at least one strip extending transversely of said glass fiber strands in said layers, cutting through said layers along said polymerized strip, removing said layers from said drum as a substantially rigid mass, cutting said mass of layers substantially parallel to said glass fiber strands to form a substantially rigid fiber glass bundle in which the opposite end portions of the glass fiber strands are bonded together by the polymerized resin and the remainder of said glass fibers are held together by the set resin, the opposite end walls of said bundle being formed by the opposite ends of said glass fiber strands, freeing the end portions of an annular peripheral array of said glass fiber strands at one end of said bundle from the remainder of said glass fiber strands, gathering said freed end portions together on one side of said bundle and bonding the same to form a third end wall adjacent to one end of said bundle, whereby light incident on said third end wall is conducted to the opposite end of said bundle along said annular array of glass fibers, and removing the set resin from said bundle to free said glass fiber strands intermediate their bonded end portions.

3. The method of making a light-conducting fiber optic device having a large number of extremely thin light-conducting coated glass fibers arranged at their ends in side-by-side aligned relation, which comprises (1) laying down on a plastic sheet having a thickness which is small compared to that of said fibers a plurality of strands of flexible glass fiber in substantially side-by-side relation to form a layer on said sheet, (2) applying an adhesive fluid to said fiber glass in an amount small enough so that the surface tension of said adhesive fluid serves to draw the glass fiber strands in said layer together, and repeating steps 1 and 2 to form a plurality of superposed glass fiber layers on said sheet while allowing said adhesive to set progressively throughout said layers to hold the glass fiber strands and the layers formed thereby together to said sheet, forming said sheet with said layers adhered thereto into a hollow cylinder with the fibers forming said layers extending axially along the exterior thereof, gathering and bonding the end portions of said fibers together adjacent to one end of said cylinder while leaving the axis of said cylinder unobstructed to form a solid end wall, whereby light incident upon said end wall is conducted along said hollow cylinder to the opposite end thereof to provide an annular light source.

4. In an apparatus for making a light-conducting optic device made up of a large number of extremely thin light-conducting coated fibers arranged at their ends in side-by-side aligned relation, means for aligning a plurality of strands of flexible light-conducting coated fiber in side-by-side and superposed relation whereby to form a plurality of superposed layers with the fiber strands in each layer in side-by-side relation, means for applying an adhesive fluid to said fiber strands in each of said layers simultaneously as each of said layers is formed, and means for accelerating the setting rate of said adhesive fluid along preselected portions of said layers while said layers are being formed so as to bond the portions of said fibers in said preselected portions in substantially rigid immovable relation one to another.

5. In an apparatus for making a light-conducting optic device made up of a large number of extremely thin light-conducting coated glass fibers arranged at their ends in side-by-side aligned relation, means for forming a supply of hot glass, a rotatably mounted drum, a carriage adjacent to one side of said drum and movable axially relative thereto, means mounted on said carriage for guiding a flexible coated glass fiber from said supply to said drum, means for rotating said drum and for shifting said carriage axially in synchronism therewith whereby to form a succession of superposed layers of coated glass fiber strands about said drum with the strands of each layer in side-by-side aligned relation, and means movable with said carriage adjacent to the opposite side of said drum for applying an adhesive fluid to the glass fiber strands of each of said layers simultaneously as each of said layers is formed, and means for accelerating the setting rate of said adhesive fluid along preselected portions of said layers while said layers are being formed so as to bond the portions of said fibers in said preselected portions in substantially rigid immovable relation one to another.

6. In an apparatus for making a light-conducting optic device made up of a large number of extremely thin light-conducting coated glass fibers arranged at their ends in side-by-side aligned relation, means for forming a supply of hot glass, a drum and means for rotating the same, a transfer roll, means supporting said transfer roll adjacent and substantially parallel to said drum with said transfer roll displaceable about said drum, means for rotating said transfer roll at a peripheral speed equal to that of said drum and including a rotatable member swingably connected to said transfer roll for running engagement with the peripheral surface of said drum, a carriage adjacent to said drum and movable axially relative thereto, means including a guide member mounted on said carriage for guiding a flexible coated glass fiber from said supply to said drum when said carriage is moved in one direction and for guiding said glass fiber from said supply to said transfer roll when said carriage is moved in the opposite direction said guide member being displaceable between two extreme positions one adjacent to said drum and the other removed therefrom, means for moving said carriage in said one direction in synchronism with the rotation of said drum whereby to form a succession of superposed layers of coated glass fiber strands about said drum with the strands of each layer in side-by-side aligned relation and with all of said strands having the same direction of advance relative to said drum, said transfer roll being displaceable about said drum toward and away from said guide member whereby said transfer roll is engageable with said glass fiber when said guide member is in its said other position, means for moving said carriage in said opposite direction while said glass fiber is guided to and wound about said transfer roll, means for applying an adhesive fluid to the glass fiber strands of each of said layers simultaneously as each of said layers is formed.

7. In an apparatus aligning a very large number of extremely thin light-conducting coated glass fiber strands in side-by-side and superposed relation for making a light-conducting optic device made up of a large number of extremely thin light-conducting coated glass fibers arranged at their ends in side-by-side aligned relation, a winding drum, said drum having a thermally nonconductive coating extending over its peripheral surface, a plurality of spaced heating elements carried by said thermally nonconductive coating and thermally insulated thereby from the remainder of said drum, and said heating elements extending axially relative to said drum along said thermally nonconductive coating.

8. In an apparatus for making a light-conducting optic device made up of a large number of extremely thin light-conducting coated glass fibers arranged at their ends in side-by-side aligned relation, means for heating glass, means for supporting and feeding a glass rod to said glass heating means, means for supporting about said rod a glass tube of a lower refractive index than said rod and for feeding said tube to said glass heating means, means for selectively varying the rate at which said tube is fed relative to said rod, a rotatably mounted drum, a carriage adjacent to said drum and movable axially relative thereto, means mounted on said carriage for guiding a flexible glass fiber drawn from said glass heating means to said drum, means for rotating said drum at a speed in relation to the temperature and rate of feed of said rod and tube such that said glass fiber is drawn with a substantially constant diameter and has a core formed of glass from said rod and a coating over the entire surface of said core formed of glass from said tube, means for shifting said carriage axially in synchronism with the rate of rotation of said drum whereby to form a succession of superposed layers of glass fiber with the strands of glass fiber in each layer in side-by-side aligned relation, means for applying an adhesive fluid to the glass fiber strands of each of said layers, and means for adjusting the rate at which said adhesive fluid is fed.

9. In an apparatus for making a light-conducting optic device made up of a large number of extremely thin light-conducting coated glass fibers arranged at their ends in side-by-side aligned relation, a furnace, means for supporting and feeding a plurality of glass rods to said furnace, means for supporting and feeding to said furnace a plurality of glass tubes one about each of said rods and having a lower refractive index than said rods, a rotatably mounted drum, a carriage adjacent to said drum, means mounted on said carriage for guiding a plurality of flexible glass coated glass fibers one from each pair of said rods and tubes from said furnace to said drum, each of said fibers having a core formed of glass from one of said rods and a coating over the entire surface of said core formed of glass from one of said tubes, means for rotating said drum and for shifting said carriage axially in synchronism therewith whereby to form a succession of superposed layers of glass fiber strands about said drum with the strands of each layer in side-by-side aligned relation, and means for applying an adhesive fluid to the glass fiber strands of each of said layers simultaneously as each of said layers is formed.

10. In an apparatus for making a light-conducting optic device made up of a large number of extremely thin light-conducting coated glass fibers arranged at their ends in side-by-side aligned relation, a furnace, means for supporting and feeding a plurality of glass rods to said furnace, means for supporting and feeding to said furnace a plurality of glass tubes one about each of said rods and having a lower refractive index than said rods, a rotatably mounted drum, a carriage adjacent to said drum, means mounted on said carriage for guiding a plurality of flexible glass coated glass fibers one from each pair of said rods and tubes from said furnace to said drum, each of said fibers having a core formed of glass from one of said rods and a coating over the entire surface of said core formed of glass from one of said tubes, means for rotating said drum and for shifting said carriage axially in synchronism therewith whereby to form a succession of superposed groups of layers of glass fiber strands about said drum with the layers of each of said groups being formed simultaneously in superposed relation and with the strands of each layer in side-by-side aligned relation, and means for applying an adhesive fluid to the glass fiber strands of each of said layers simultaneously as each of said layers is formed.

11. In an apparatus for making a light-conducting optic device made up of a large number of extremely thin light-conducting coated fibers arranged at their ends in side-by-side aligned relation, means including a rotatable drum for winding a plurality of strands of flexible light-conducting coated fiber in side-by-side and superposed relation whereby to form a plurality of superposed layers with the fiber strands in each layer in side-by-side relation, means for applying an adhesive fluid to said fiber strands in each of said layers simultaneously as each of said layers is formed, means for winding each succeeding layer about said drum with the same direction of advance as the layer preceding the same, and means for accelerating the setting rate of said adhesive fluid along preselected portions of said layers while said layers are being formed so as to bond the portions of said fibers in said preselected portions in substantially rigid immovable relation one to another.

12. The method of making light-conducting fiber optics devices having a large number of extremely thin light-conducting coated glass fibers arranged at their ends in side-by-side relation, which comprises the steps of drawing glass fiber from a supply of hot glass and forming a plurality of superposed layers with the glass fiber in each layer extending in substantially side-by-side relation, applying an adhesive material to the glass fiber to substantially the entire extent of said glass fiber in each of said layers while said layers are being formed, accelerating the setting rate of said adhesive material along preselected portions of said layers while said layers are being formed so as to bond the portions of said fibers in said preselected portions in substantially rigid immovable relation one to another while allowing the remainder of said adhesive material to set sufficiently to hold together the remainder of said glass fiber forming said layers.

13. The method as set forth in claim 12 which further comprises using a polymerizable resin-bearing liquid as said adhesive material.

14. The method of making light-conducting fiber optics devices having a large number of extremely thin light-conducting coated glass fibers arranged at their ends in side-by-side relation, which comprises the steps of drawing glass fiber from a supply of hot glass and forming a plurality of superposed layers with the glass fiber in each layer extending in substantially side-by-side relation, applying an adhesive material to the glass fiber to substantially the entire extent of said glass fiber in each of said layers while said layers are being formed, accelerating the setting rate of said adhesive material along preselected portions of said layers while said layers are being formed so as to bond the portions of said fibers in said preselected portions in substantially rigid immovable relation one to another while allowing the remainder of said adhesive material to set sufficiently to hold together the remainder of said glass fiber forming said layers, cutting the thus formed adhesively united glass fiber layers substantially parallel to the glass fiber whereby to form a strip containing a multiplicity of glass fibers held together along their entire length in substantially side-by-side and superposed relation, and then removing the adhesive from said glass fibers in said strip except in said preselected portions whereby to free the fibers intermediate said preselected portions.

15. The method of making light-conducting fiber optics devices having a large number of extremely thin light-conducting coated glass fibers arranged at their ends in side-by-side relation, which comprises the steps of drawing glass fiber from a supply of hot glass and forming a plurality of superposed layers with the glass fiber in each layer extending in substantially side-by-side relation, applying an adhesive material to the glass fiber to substantially the entire extent of said glass fiber in each of said layers while said layers are being formed, accelerating the setting rate of said adhesive material along preselected portions of said layers extending transversely to said fibers while said layers are being formed so as to bond the portions of said fibers in said preselected portions in substantially rigid immovable relation one to another while allowing the remainder of said adhesive material to set sufficiently to hold together the remainder of said glass fiber forming said layers, cutting said layers along at least one preselected portion transverse to said fibers, cutting the thus formed adhesively united glass fiber layers substantially parallel to the glass fiber whereby to form a strip containing a multiplicity of glass fibers held together along their entire length in substantially side-by-side and superposed relation, and then removing the adhesive from said glass fibers in said strip except in said preselected portions whereby to free the fibers intermediate said preselected portions.

16. The method of making light-conducting fiber optics devices having a large number of extremely thin light-conducting coated glass fibers arranged at their ends in side-by-side relation, which comprises the steps of drawing glass fiber from a supply of hot glass and forming a plurality of superposed layers with the glass fiber in each layer extending in substantially side-by-side relation, applying an adhesive material to the glass fiber to substantially the entire extent of said glass fiber in each of said layers while said layers are being formed, accelerating the setting rate of said adhesive material along preselected portions of said layers extending transversely to said fibers while said layers are being formed so as to bond the portions of said fibers in said preselected portions in substantially rigid immovable relation one to another while allowing the remainder of said adhesive material to set sufficiently to hold together the remainder of said glass fiber forming said layers, cutting said layers along at least one preselected portion transverse to said fibers, cutting the thus formed adhesively united glass fiber layers substantially parallel to the glass fiber whereby to form a strip containing a multiplicity of glass fibers held together along their entire length in substantially side-by-side and superposed relation, removing selected ones of the glass fibers extending along said strip to modify the shape thereof, and then removing the adhesive from said glass fibers in said strip except in said preselected portions whereby to free the fibers intermediate said preselected portions.

17. The method of making light-conducting fiber optics devices having a large number of extremely thin light-conducting coated glass fibers arranged at their ends in side-by-side relation, which comprises the steps of drawing a plurality of glass fibers from a supply of hot glass and forming a plurality of superposed layers one for each of said fibers with the glass fiber in each layer extending in substantially side-by-side relation, applying an adhesive material to the glass fiber to substantially the entire extent of said glass fiber in each of said layers while said layers are being formed, and accelerating the setting rate of said adhesive material along preselected portions of said layers while said layers are being formed so as to bond the portions of said fibers in said preselected portions in substantially rigid immovable relation one to another while allowing the remainder of said adhesive material to set sufficiently to hold together the remainder of said glass fiber forming said layers.

18. In an apparatus for aligning a very large number of extremely thin light-conducting coated glass fiber strands in side-by-side and superposed relation for making a light-conducting optics device made up of a large number of extremely thin light-conducting coated glass fibers arranged at their ends in side-by-side aligned relation, a winding drum, said drum having a thermally nonconductive coating extending over its peripheral surface, a plurality of spaced heating elements carried by said thermally nonconductive coating and thermally insulated thereby from the remainder of said drum, said heating elements extending axially relative to said drum along said thermally nonconductive coating, and means for selectively energizing said heating elements.

19. The method of making a light-conducting fiber optics device having a large number of extremely thin light-conducting coated glass fibers arranged in side-by-side aligned relation, which comprises laying down on a plastic sheet having a thickness which is small compared to that of said fibers a plurality of strands of flexible light-conducting coated glass fibers in substantially side-by-side relation to form a plurality of superposed layers of said fibers on said sheet, applying an adhesive fluid to said fibers in said layers substantially simultaneously as said layers are formed on said sheet, and shaping said sheet with said fiber layers thereon including gathering and bonding in compact substantially rigid immovable relation the end portions of said fibers adjacent one end of said sheet to form a solid end wall so that light incident upon said end wall is conducted along said fibers to the other ends thereof.

References Cited by the Examiner

UNITED STATES PATENTS

| | | | |
|---|---|---|---|
| 2,656,873 | 10/1953 | Stephens | 156—167 |
| 2,699,415 | 1/1955 | Nachtman | 156—173 |
| 2,825,260 | 3/1958 | O'Brien | 88—1 |
| 2,943,968 | 7/1960 | Freeman et al. | 154—90 |
| 3,033,731 | 5/1962 | Cole | 156—175 |
| 3,104,191 | 9/1963 | Hicks et al. | 156—174 |
| 3,134,704 | 5/1964 | Modigliani | 156—167 |
| 3,148,102 | 9/1964 | Eakins et al. | 156—181 |

EARL M. BERGERT, *Primary Examiner.*

E. S. ANDERSON, *Examiner.*

UNITED STATES PATENT OFFICE
CERTIFICATE OF CORRECTION

Patent No. 3,236,710             February 22, 1966

Lawrence E. Curtiss

It is hereby certified that error appears in the above numbered patent requiring correction and that the said Letters Patent should read as corrected below.

In the grant, lines 4 and 13, and in the heading to the printed specification, lines 6 and 7, for "Wilbur Peters", each occurrence, read -- C. Wilbur Peters --; column 7, line 21, for "exible" read -- flexible --; line 69, after "14" insert -- is --; column 8, line 37, for "systems" read -- system --; line 54, for "alingned" read -- aligned --; line 55, for "cariage" read -- carriage --; column 14, line 74, for "its" read -- it --; column 16, line 46, before "to" insert -- and --; column 17, line 52, after "apparatus" insert -- for --.

Signed and sealed this 11th day of July 1967.

(SEAL)
Attest:

ERNEST W. SWIDER                      EDWARD J. BRENNER
Attesting Officer                 Commissioner of Patents